(12) United States Patent
Kawamura et al.

(10) Patent No.: US 9,392,448 B2
(45) Date of Patent: Jul. 12, 2016

(54) WIRELESS COMMUNICATIONS SYSTEM

(71) Applicant: KABUSHIKI KAISHA TOKAI RIKA DENKI SEISAKUSHO, Aichi (JP)

(72) Inventors: Daisuke Kawamura, Aichi (JP); Hideki Kawai, Aichi (JP); Tetsuya Egawa, Aichi (JP); Hiroaki Iwashita, Aichi (JP); Toshihiro Nagae, Aichi (JP)

(73) Assignee: KABUSHIKI KAISHA TOKI RIKA DENKI SEISAKUSHO, Aichi (JP)

( * ) Notice: Subject to any disclaimer, the term of this patent is extended or adjusted under 35 U.S.C. 154(b) by 53 days.

(21) Appl. No.: 14/373,146

(22) PCT Filed: Jan. 18, 2013

(86) PCT No.: PCT/JP2013/050915
§ 371 (c)(1),
(2) Date: Jul. 18, 2014

(87) PCT Pub. No.: WO2013/114971
PCT Pub. Date: Aug. 8, 2013

(65) Prior Publication Data
US 2014/0355761 A1 Dec. 4, 2014

(30) Foreign Application Priority Data
Jan. 31, 2012 (JP) .................. 2012-018585

(51) Int. Cl.
*H04W 12/04* (2009.01)
*H04L 9/08* (2006.01)
(Continued)

(52) U.S. Cl.
CPC .............. *H04W 12/04* (2013.01); *B60R 25/24* (2013.01); *G07C 9/00309* (2013.01); *H04L 9/0861* (2013.01); *H04L 9/3271* (2013.01);
(Continued)

(58) Field of Classification Search
CPC ..... H04L 12/04; H04L 9/0861; H04L 9/3271; H04L 2209/84; H04L 2209/80; H04L 9/3273; H04L 9/0891; H04L 2009/84; H04L 2009/80; B06R 25/24; G07C 9/00309; G07C 2009/00412; G07C 2009/00793; G07C 9/00174

See application file for complete search history.

(56) References Cited

U.S. PATENT DOCUMENTS 4,209,782 A * 6/1980 Donath et al. ............. 235/382.5
5,363,447 A * 11/1994 Rager et al. .................. 380/273

(Continued)

FOREIGN PATENT DOCUMENTS

JP 2001-323704 11/2001
JP 2005-343430 12/2005

(Continued)

OTHER PUBLICATIONS

U.S. Appl. No. 14/373,240 to Daisuke Kawamura et al., filed Jul. 18, 2014.

(Continued)

*Primary Examiner* — Eleni Shiferaw
*Assistant Examiner* — Nelson Giddins
(74) *Attorney, Agent, or Firm* — Greenblum & Bernstein, P.L.C.

(57) ABSTRACT

A wireless communications system that regularly executes verification between an electronic key and an immobilizer ECU, and sends and receives deletion request signals unrelated to verification, between the electronic key and the immobilizer ECU. The sending and receiving of deletion request signals is executed at intervals between the regularly executed verifications.

6 Claims, 5 Drawing Sheets

(51) Int. Cl.
*H04L 9/32* (2006.01)
*G07C 9/00* (2006.01)
*B60R 25/24* (2013.01)

(52) U.S. Cl.
CPC ............... *G07C2009/00412* (2013.01); *G07C 2009/00793* (2013.01); *H04L 2209/80* (2013.01); *H04L 2209/84* (2013.01)

(56) References Cited

U.S. PATENT DOCUMENTS

| | | | | |
|---|---|---|---|---|
| 5,390,252 | A * | 2/1995 | Suzuki et al. | 380/247 |
| 5,745,044 | A * | 4/1998 | Hyatt et al. | 340/5.23 |
| 6,144,315 | A * | 11/2000 | Flick | 340/12.28 |
| 6,711,263 | B1 * | 3/2004 | Nordenstam et al. | 380/282 |
| 8,207,817 | B2 * | 6/2012 | Kamiya | 340/5.7 |
| 8,799,657 | B2 * | 8/2014 | Bhattacharya et al. | 713/171 |
| 2003/0014372 | A1 * | 1/2003 | Wheeler et al. | 705/71 |
| 2004/0187035 | A1 * | 9/2004 | Schwan et al. | 713/202 |
| 2004/0222699 | A1 * | 11/2004 | Bottomley | 307/9.1 |
| 2005/0052276 | A1 * | 3/2005 | Kumazaki et al. | 340/5.61 |
| 2005/0205993 | A1 * | 9/2005 | Yamaguchi | 257/738 |
| 2006/0003739 | A1 * | 1/2006 | Sasakura et al. | 455/411 |
| 2006/0082435 | A1 * | 4/2006 | Matsumoto et al. | 340/5.23 |
| 2006/0111046 | A1 * | 5/2006 | Sugimoto et al. | 455/41.2 |
| 2007/0021141 | A1 * | 1/2007 | Yokota et al. | 455/550.1 |
| 2007/0040649 | A1 * | 2/2007 | Dulgerian et al. | 340/5.64 |
| 2007/0198848 | A1 * | 8/2007 | Bjorn | 713/186 |
| 2007/0273489 | A1 * | 11/2007 | Tauchi et al. | 340/426.11 |
| 2009/0022317 | A1 * | 1/2009 | Akima et al. | 380/277 |
| 2009/0300772 | A1 * | 12/2009 | Al-Azzawi | 726/26 |
| 2009/0309696 | A1 * | 12/2009 | Tsuruta et al. | 340/5.22 |
| 2010/0073153 | A1 * | 3/2010 | Yamaguchi et al. | 340/426.17 |
| 2010/0220857 | A1 * | 9/2010 | Kawamura et al. | 380/44 |
| 2011/0064224 | A1 * | 3/2011 | Rebuli | 380/277 |
| 2011/0244798 | A1 * | 10/2011 | Daigle et al. | 455/41.2 |
| 2012/0331296 | A1 * | 12/2012 | Levin et al. | 713/170 |
| 2013/0329890 | A1 * | 12/2013 | Kawamura et al. | 380/281 |
| 2014/0037092 | A1 * | 2/2014 | Bhattacharya et al. | 380/259 |
| 2015/0172292 | A1 * | 6/2015 | Kuang et al. | 713/155 |

FOREIGN PATENT DOCUMENTS

| | | |
|---|---|---|
| JP | 2006-21597 | 1/2006 |
| JP | 2006-144480 | 6/2006 |
| JP | 2006-207361 | 8/2006 |
| JP | 2009-271936 | 11/2009 |
| JP | 2009-302848 | 12/2009 |
| JP | 2010-206383 | 9/2010 |
| JP | 2010-280368 | 12/2010 |
| WO | 2004/086294 | 10/2004 |

OTHER PUBLICATIONS

International Search Report in PCT/JP2013/050915, mailed Mar. 5, 2013.

English language translation of International Preliminary Report on Patentability in PCT/JP2013/050915, mailed Aug. 5, 2014.

Office Action issued in Japan Counterpart Patent Appl. No. 2012-018585, dated Dec. 22, 2015, along with an English translation thereof.

* cited by examiner

<Registration Operation>

Fig.5

<Additional Key Production Operation>

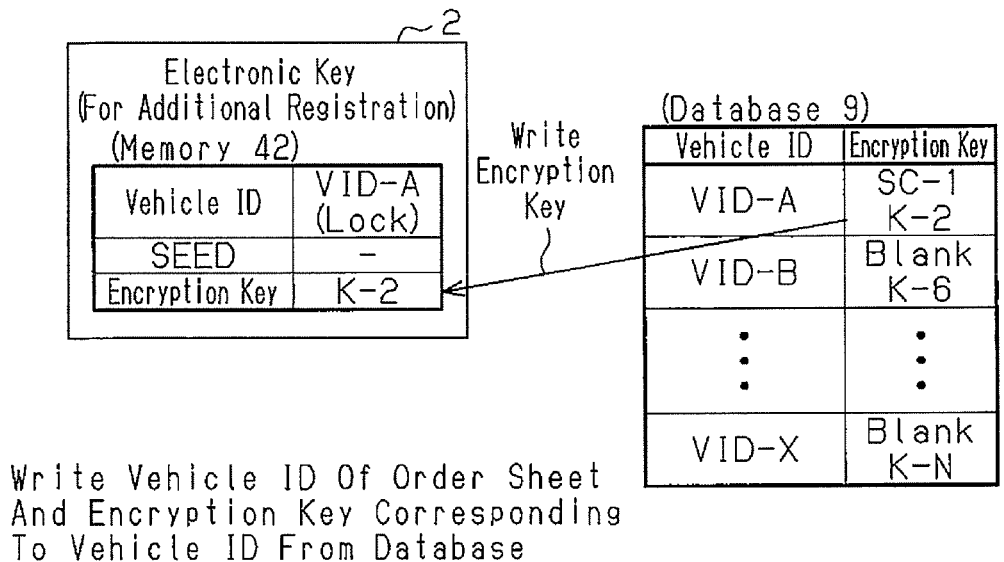

Write Vehicle ID Of Order Sheet
And Encryption Key Corresponding
To Vehicle ID From Database

Fig.6

<Replacement ECU Production Operation>

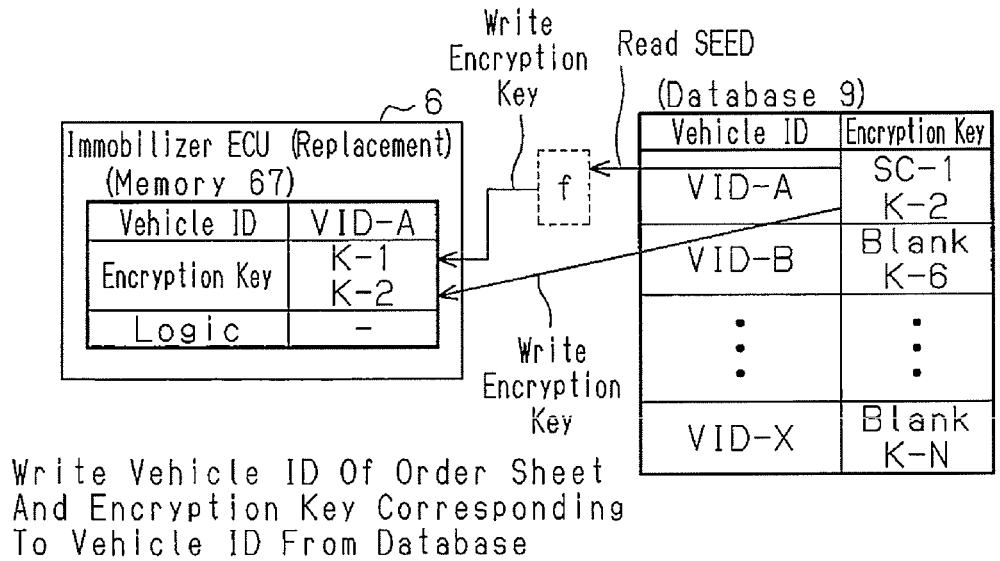

Write Vehicle ID Of Order Sheet
And Encryption Key Corresponding
To Vehicle ID From Database Generate Encryption Key From SEED Code
Using Key Generation Logic f
And Write Encryption Key

WIRELESS COMMUNICATIONS SYSTEM

TECHNICAL FIELD

The present invention relates to a radio communication system that performs radio communication between a portable device and a communication subject.

BACKGROUND ART

A conventional portable device system performs encrypted communication between a vehicle and a portable device, which a user of the vehicle carries, and permits or performs locking or unlocking of a vehicle door and the starting or stopping of the engine when the verification is successful. The communication between the portable device and the vehicle is encrypted and protected (for example, refer to patent document 1).

As the above encrypted communication, the common key cryptosystem that uses the same encryption key for encryption and decryption is known. A common encryption key, that is, the same encryption key is registered to a portable device and a vehicle, which perform encrypted communication using the common key cryptosystem. The encryption key is registered to the portable device and the vehicle when registering the portable device to a controller of the vehicle. The controller verifies the portable device by verifying identification information that is received through radio communication from the portable device with identification information that is stored in the controller.

PRIOR ART DOCUMENT

Patent Document

Patent Document 1: Japanese Laid-Open Patent Publication No. 2009-302848

SUMMARY OF THE INVENTION

There are electronic key systems that perform communication for verification and verification for purposes other than verification between an electronic key and a controller. One example of an electronic key system transmits a vehicle status stored in the controller through radio communication to the electronic key so that a user who is carrying the electronic key may check the vehicle status. In such an electronic key system that uses the same structure to perform two or more different types of communication, for example, radio communication of a verification signal may be disabled when radio communication of a non-verification signal is being performed. When verification between the electronic key and the controller cannot be performed due to the radio communication of a non-verification signal, the locking or unlocking of a vehicle door and the starting or stopping of the engine may be disabled. This is inconvenient for the user of the vehicle. When the electronic key cannot receive the vehicle status due to the communication of the verification signal, the user cannot check the vehicle status from the electronic key.

It is an object of the present invention to provide a radio communication system that is easy to use.

One aspect of the present invention provides a radio communication system that periodically performs verification between a portable device and a communication subject and exchanges an information signal, which includes information differing from that of the verification, between the portable device and the communication subject. The exchange of the information signal is performed during a period between a verification and a further verification that are periodically performed.

In this structure, a signal used for normal verification does not overlap with an information signal. Thus, normal verification between the controller and the portable device is performed without interference from the information signal.

In one example, the portable device and the communication subject hold the same encryption key, and the verification performed between the portable device and a controller of the communication subject use the encryption key. The controller stores identification information, which is unique to the communication subject, and a key generation logic, which is used to generate the encryption key. The portable device stores an encryption key generation code, which is unique to the portable device, and the encryption key, which is generated using the encryption key generation code and the key generation logic. The controller performs a registration process including writing the identification information to the portable device through radio communication with the portable device, retrieving the encryption key generation code from the portable device through radio communication with the portable device, generating an encryption key that is the same as that of the portable device from the retrieved key generation code using the key generation logic stored in the controller, and storing the generated encryption key in the controller. The controller transmits, to the portable device, a deletion request signal, which requests for deletion of the encryption key generation code and serves as the information signal during a period between a present verification and a following verification. The portable device deletes the encryption key generation code from the portable device when receiving the deletion request signal.

One example further includes a database that saves identification information, which is stored in the controller of the communication subject prior to shipment, in association with an additional registration encryption key or an additional registration encryption key generation code, and a supplemental portable device and a supplemental controller that store the identification information, which is saved in the database, and an encryption key, which is generated from the additional registration encryption key or the additional registration encryption key generation code saved in the database.

In one example, the controller of the communication subject deletes the key generation logic from the controller after the encryption key is generated.

In one example, the communication subject repeatedly transmits a signal for performing the verification in intervals of a controlled period. The communication subject transmits the information signal whenever the communication subject transmits the signal for performing the verification during the controlled period.

In one example, the communication subject transmits the information signal during the controlled period and the verification signal during a period other than the controlled period.

In one example, the portable device stores an encryption key generation code to generate an encryption key used for the verification. The communication subject transmits a deletion request signal, which requests for deletion of the encryption key generation code from the portable device and serves as the information signal.

BRIEF DESCRIPTION OF THE DRAWINGS

FIG. 5 is a schematic diagram showing the production of an additional key for the electronic key system.

FIG. 6 is a schematic diagram showing the production of a replacement ECU for the electronic key system.

EMBODIMENTS OF THE INVENTION

A radio communication system according to one embodiment of the present invention will now be described below.

Figure 1:
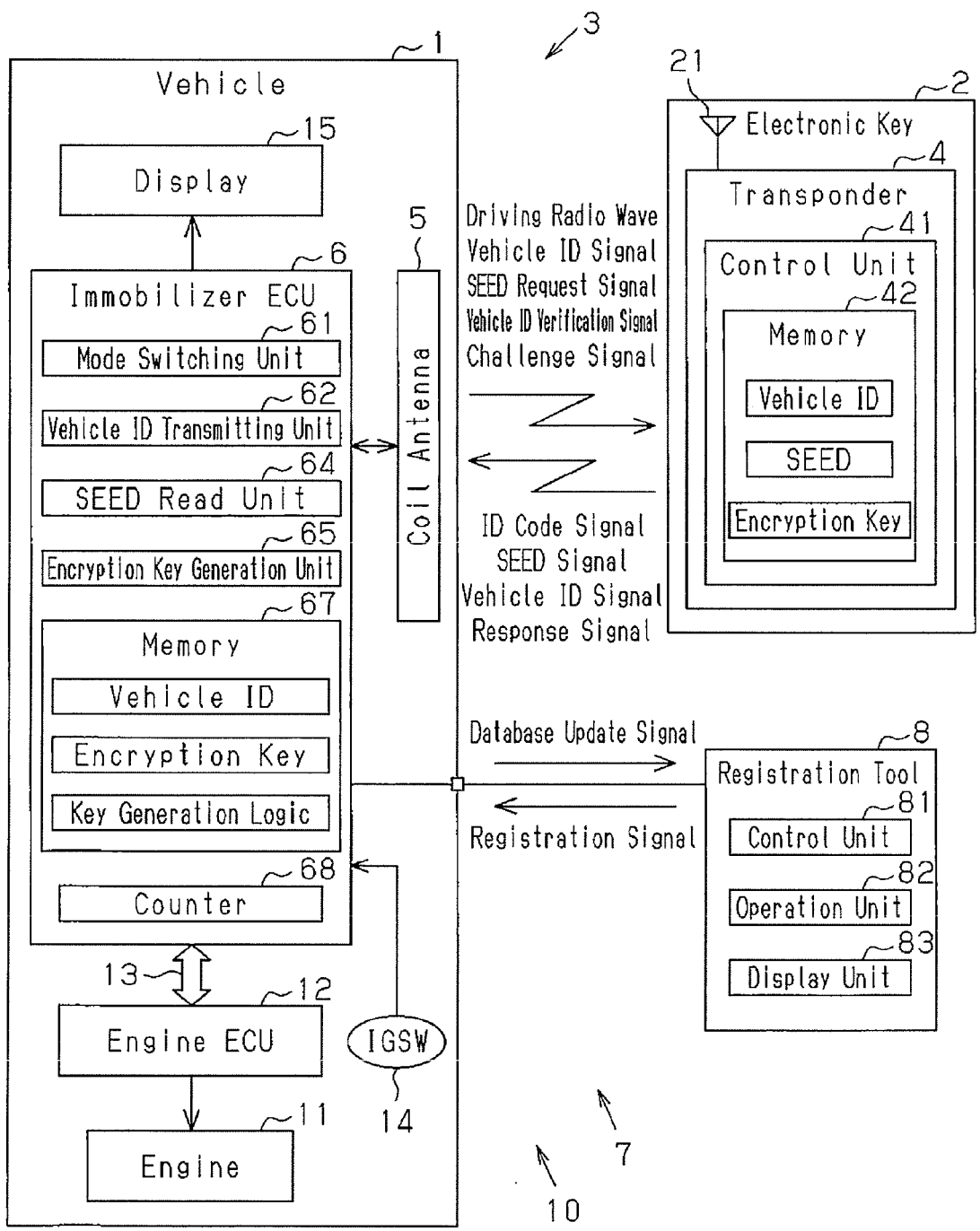
FIG. 1 is a block diagram of an electronic key system.

As shown in FIG. 1, a vehicle 1 includes an immobilizer system 3 that performs ID verification with an electronic key 2 through, for example, near field communication (radio communication in which the communication distance is approximately a few centimeters). The electronic key 2 includes a transponder 4, which can be an ID tag. The transponder 4 is activated by a driving radio wave, which is transmitted from a coil antenna 5 of the vehicle 1, and transmits an ID code signal. The immobilizer system 3 includes an immobilizer ECU 6, which is arranged in the vehicle 1. The immobilizer ECU 6 performs ID verification based on the ID code signal, which is transmitted from the transponder 4. The vehicle 1 is one example of a communication subject. The immobilizer system 3 is one example of an electronic key system or radio communication system. The immobilizer ECU 6 is one example of a controller.

An engine ECU 12, which controls an engine 11, is connected to the immobilizer ECU 6 through an in-vehicle LAN 13. An ID code of the electronic key 2, which is paired with the vehicle 1, is registered to a memory 67 of the immobilizer ECU 6. The coil antenna 5, which receives and transmits radio waves in the low frequency (LF) bandwidth and radio waves in the high frequency (HF) bandwidth, is connected to the immobilizer ECU 6. In a preferred example, the coil antenna 5 is a magnetic field antenna and arranged in a key cylinder.

The transponder 4 includes a control unit 41, which controls communication operations of the electronic key 2. A unique ID code (transponder code) of the electronic key 2 is registered to a memory 42 of the control unit 41. The transponder 4 includes an antenna 21, which receives and transmits radio waves in the LF bandwidth and radio waves in the HF bandwidth.

The immobilizer ECU 6 intermittently transmits the driving radio wave from the coil antenna 5 when detecting the insertion of the electronic key 2 in the key cylinder. For example, a user enters the vehicle and inserts the electronic key 2 into the key cylinder and operates the electronic key 2 to start the engine 11. Then, the transponder 4 receives, with a receiving-transmitting antenna 21, the driving radio wave, which is transmitted from the coil antenna 5. This activates the transponder 4 using the driving radio wave as a power supply. The activated transponder 4 transmits, from the receiving-transmitting antenna 21, an ID code signal that includes the ID code, which is registered to the transponder 4. When the immobilizer ECU 6 receives, with the coil antenna 5, the ID code signal, which is transmitted from the transponder 4, the immobilizer ECU 6 performs ID verification (immobilizer verification) on the ID code, which is included in the received ID code signal. The immobilizer ECU 6 stores the result of ID verification in the memory 67.

The key cylinder includes an ignition switch (IGSW) 14, which detects the rotation position of the electronic key 2. When the ignition switch 14 detects that the electronic key 2 has been moved to the engine-starting position, the engine ECU 12 obtains the ID verification result from the immobilizer ECU 6. If the result indicates verification accomplishment, the engine ECU 12 initiates ignition control and fuel injection control and starts the engine 11.

In addition to verification of the ID code of the electronic key 2, the immobilizer ECU 6 performs challenge response verification. The challenge response verification is performed as follows. First, a challenge code, which is, for example, a random number code, is transmitted from the vehicle 1 to the electronic key 2. The electronic key 2 calculates a response code and sends the response code back to the vehicle 1. The immobilizer ECU 6 of the vehicle 1 determines whether or not a response code calculated by the immobilizer ECU 6 is the same as the response code received from the electronic key 2 and verifies the electronic key 2 when the two codes are the same. In the illustrated example, the common key cryptosystem, which uses a common encryption key, is employed for verification between the immobilizer ECU 6 and the transponder 4. The electronic key 2 and the immobilizer ECU 6 store a common encryption key. The electronic key 2 and the immobilizer ECU 6 use the common encryption key to calculate the response code from the challenge code.

A vehicle ID (VID) that is identification information unique to the vehicle 1, a SEED code (SC) that is used for generation of an encryption key K, and the encryption key K that is used for verification are stored in the memory 42 of the transponder 4. The SEED code is also referred to as the encryption key generation code.

A vehicle ID (VID) that is identification information unique to the vehicle 1, an encryption key K that is used for verification, and a key generation logic f that is like an arithmetic expression and an algorithm and used for generation of the encryption key K are stored in the memory 67 of the immobilizer ECU 6.

Figure 2:
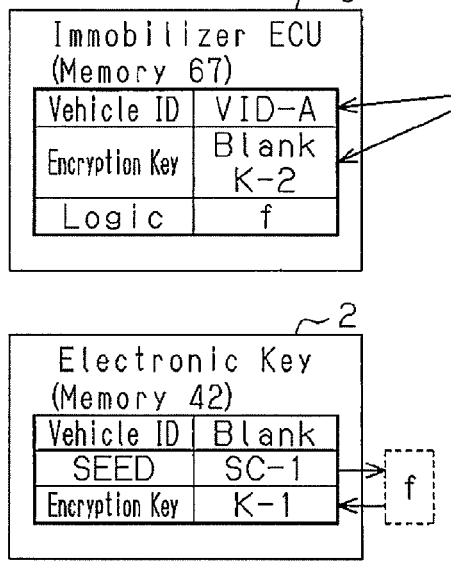
FIG. 2 is a schematic diagram showing the production of the electronic key system.

The immobilizer system 3 includes an electronic key registration system 7, which registers the electronic key 2 to the immobilizer ECU 6. In the electronic key registration system 7, each of the electronic key 2 and the immobilizer ECU 6 registers information that it does not possess but its peer possesses through radio communication between the electronic key 2 and the immobilizer ECU 6. The electronic key registration system 7 includes a database 9, in which a plurality of encryption keys is stored in accordance with a single vehicle ID. The database 9 may be located in a component factory for manufacturing the electronic key 2 and the immobilizer ECU 6. As shown in FIG. 2, an encryption key (K-2) corresponding to a vehicle ID (VID-A), which is identification information unique to the vehicle 1, is saved in the database 9. When the immobilizer ECU 6 and the electronic key 2 are being manufactured, data that is selectively extracted from the database 9 is stored in the memories 42 and 67.

As shown in FIG. 1, the electronic key registration system 7 includes a registration tool 8 that registers the electronic key 2 to the immobilizer ECU 6. The registration tool 8 is connected to the vehicle 1 when used. The registration tool 8 switches operation modes of the immobilizer ECU 6 between a normal mode and a registration mode. The immobilizer ECU 6 in the registration mode performs radio communication with the electronic key 2 to have the electronic key 2 register the unique information of the immobilizer ECU 6, namely, the vehicle ID (VID-A) that is information possessed by the immobilizer ECU 6 but not by the electronic key 2. Also, the immobilizer ECU 6 receives, from the electronic key 2, the unique information of the electronic key 2, namely, the encryption key (K-1) that is information possessed by the electronic key 2 but not by the immobilizer ECU 6, and registers the unique information of the electronic key 2 to the immobilizer ECU 6 (the memory 67). The registration tool 8 includes a control unit 81 that controls the registration tool 8, an operation unit 82 that detects a registration operation performed by a user, and a display unit 83 that displays a registration operation. When the registration mode is set by the user, the registration tool 8 provides the vehicle 1 with a registration signal (also referred to as the registration instruction) that shifts the immobilizer ECU 6 to the registration mode. The registration tool 8 updates the database 9 through a network, which is not shown in the drawings, when receiving a database update signal (also referred to as the update instruction) from the immobilizer ECU 6.

The immobilizer ECU 6 includes a mode switching unit 61, which switches operation modes of the immobilizer ECU 6. The mode switching unit 61 switches the operation modes of the immobilizer ECU 6 from the normal mode to the registration mode when the registration signal is provided from the registration tool 8. When the immobilizer ECU 6 is disconnected from the registration tool 8 after being switched to the registration mode, the mode switching unit 61 switches the immobilizer ECU 6 to the normal mode. The immobilizer ECU 6 in the normal mode performs normal verification, that is, ID verification, with the electronic key 2.

The immobilizer ECU 6 includes a vehicle ID transmitting unit 62, which transmits the vehicle ID in the immobilizer ECU 6 to the electronic key 2. When the immobilizer ECU 6 is switched to the registration mode, the vehicle ID transmitting unit 62 transmits the vehicle ID signal, which includes the vehicle ID that is stored in the memory 67, from the coil antenna 5 to the electronic key 2.

The immobilizer ECU 6 includes a SEED read unit 64, which reads the SEED code of the electronic key 2 to generate the same encryption key as the encryption key K that is stored in the electronic key 2. For example, the immobilizer ECU 6 transmits a SEED request signal, which requests for a SEED code, from the coil antenna 5. When receiving the SEED request signal, the electronic key 2 generates the SEED signal, which includes the SEED code, and transmits the generated SEED signal. The SEED read unit 64 retrieves the SEED code from the SEED signal, which is received through the coil antenna 5.

The immobilizer ECU 6 includes an encryption key generation unit 65, which generates the encryption key K. The encryption key generation unit 65 generates the encryption key K from the SEED code, which is obtained by the SEED read unit 64, by using the key generation logic f in the memory 67.

The immobilizer system 3 includes an encryption key generation code deletion system 10, which deletes the SEED code from the memory 42 of the electronic key 2. In the encryption key generation code deletion system 10, the immobilizer ECU 6 transmits a deletion request signal, which requests the electronic key 2 to delete the SEED code (refer to FIG. 7). When receiving the deletion request signal, the electronic key 2 deletes the SEED code from the memory 42. The encryption key generation code deletion system 10 is activated during an interval between when a normal verification (challenge response verification) is performed and when the following normal verification is performed between the electronic key 2 and the immobilizer ECU 6. In a preferred example, after performing normal verification with the electronic key 2, the immobilizer ECU 6 transmits the deletion request signal to the electronic key 2 only once.

The immobilizer ECU 6 includes a counter 68, which counts the number of times the deletion request signal is transmitted. The immobilizer ECU 6 transmits the deletion request signal until the number of times the deletion request signal is transmitted, which is counted by the counter 68, reaches a transmission frequency threshold. The transmission frequency threshold is set to a sufficient number of times for the electronic key 2 to receive the deletion request signal inside the vehicle 1. In a non-restrictive example, the threshold is ten times. The deletion request signal is one example of an information signal that includes information differing from that used for verification.

Next, an operation for registering the electronic key 2 to the immobilizer ECU 6 will be described with reference to FIGS. 2 to 7.

The vehicle 1 includes a wide variety of components. Each component is manufactured in a component factory and sent to an assembly factory and installed in the vehicle 1. For example, the immobilizer ECU 6 and the electronic key 2 are manufactured in the same factory or in different factories. Then, the immobilizer ECU 6 is installed in the vehicle in the assembly factory, and the electronic key 2 is registered to the immobilizer ECU 6.

First, the manufacturing task performed in the component factory prior to the registration operation will be described. As shown in FIG. 2, the key generation logic f is stored in the memory 67 of the immobilizer ECU 6 that is manufactured for initial registration. Additionally, the vehicle ID (VID-A) of the vehicle 1, to which the immobilizer ECU 6 is installed, and the encryption key (K-2) of an additionally registered electronic key 2 are extracted from the database 9 and stored in the memory 67. The SEED code (SC-1) is stored in the memory 42 of the electronic key 2 that is manufactured for initial registration. The SEED code (SC-1) is one example of an encryption key generation code unique to the electronic key 2. The encryption key (K-1), which is generated from the SEED code (SC-1) by using the key generation logic f, is stored in the memory 42. As shown in FIG. 2, at a point of time when the manufacturing operation is completed in the component factory, the encryption key (K-1) is not stored in the immobilizer ECU 6, and the vehicle ID is not stored in the electronic key 2.

Figure 3:
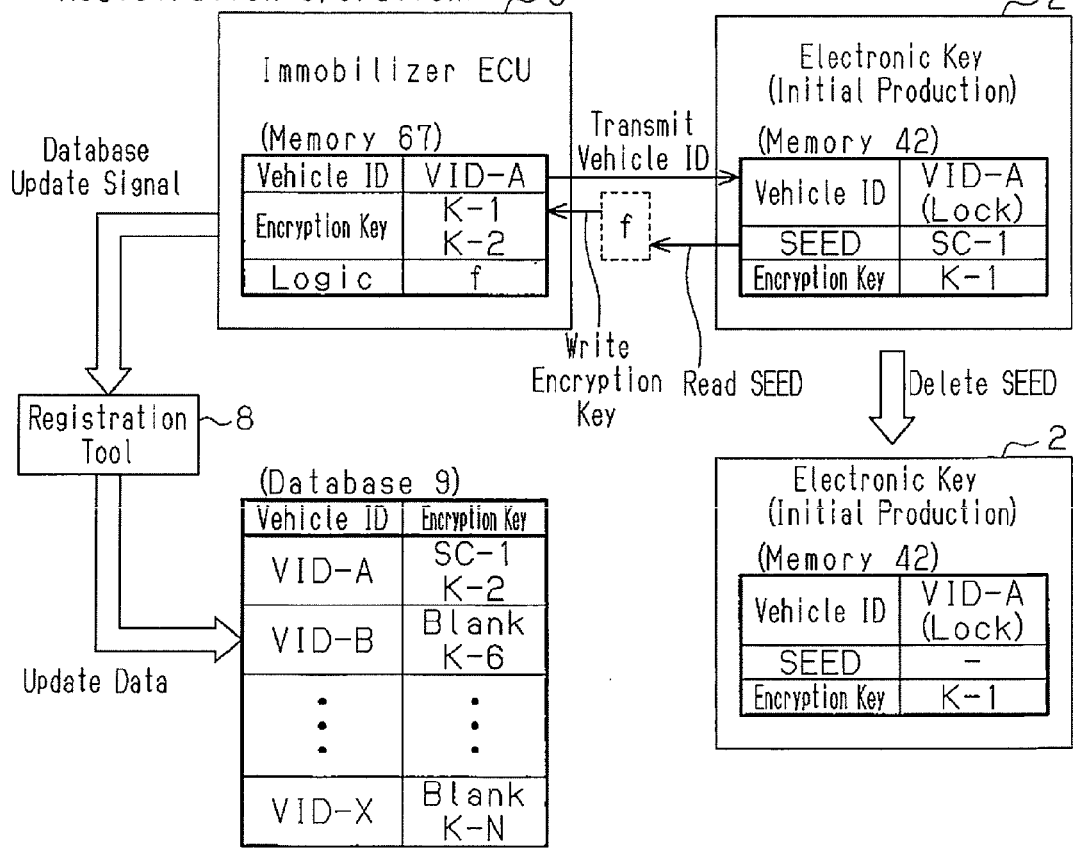
FIG. 3 is a schematic diagram showing the registration of the electronic key system.

Next, the registration operation of the electronic key 2 in the assembly factory will be described. In the example of FIG. 3, first, the immobilizer ECU 6 transmits the vehicle ID signal, which includes the vehicle ID (VID-A). When the electronic key 2 receives the ID code signal from the immobilizer ECU 6, the electronic key 2 registers the vehicle ID included in the vehicle ID signal to the memory 42. Also, the electronic key 2 transmits the SEED code signal, which includes the SEED code (SC-1). The immobilizer ECU 6 temporarily stores the SEED code included in the SEED code signal in the memory 67, generates the encryption key (K-1) from the SEED code by using the key generation logic f, and stores the encryption key (K-1) in the memory 67. The SEED code may be deleted from the memory 67, for example, after updating the database 9, which will be described later.

Figure 4:
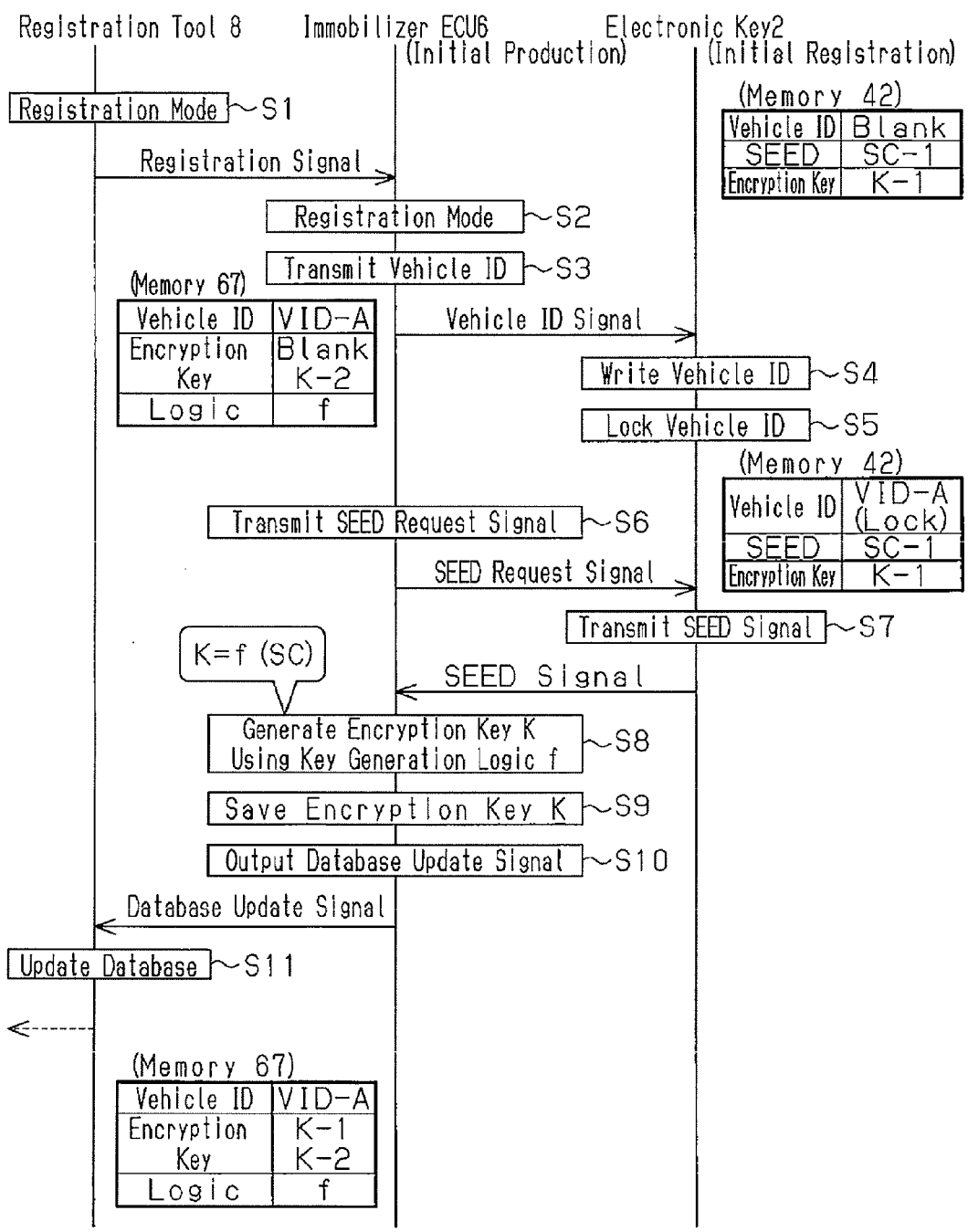
FIG. 4 is a sequence chart showing the registration of the electronic key system.

The registration process of the electronic key 2 will now be described in detail. As shown in FIG. 4, the registration tool 8 provides the immobilizer ECU 6 with the registration signal when the registration mode is set by the user (step S1). The immobilizer ECU 6 switches the operation mode to the registration mode when receiving the registration signal (step S2).

Then, the immobilizer ECU 6 transmits the vehicle ID signal, which includes the vehicle ID (VID-A) that is stored in the memory 67, from the coil antenna 5 to the electronic key 2 (step S3).

When the electronic key 2 receives the vehicle ID signal, the electronic key 2 stores the vehicle ID (VID-A) included in the vehicle ID signal in the memory 42 (step S4). In a preferred example, the electronic key 2 locks the vehicle ID (step S5) and prohibits overwriting of the vehicle ID in the memory 42. As a result, the electronic key 2 prevents rewriting of the vehicle ID to the memory 42.

Following the transmission of the vehicle ID in step S3, the immobilizer ECU 6 transmits the SEED request signal, which requests for transmission of the SEED code, from the coil antenna 5 (step S6).

In response to the SEED request signal, the electronic key 2 transmits the SEED signal that includes the SEED code (SC-1) stored in the memory 42 (step S7).

The immobilizer ECU 6 generates the encryption key (K-1) from the SEED code (SC-1) in the received SEED signal by using the key generation logic f (step S8). In other words, the immobilizer ECU 6 does not directly obtain the encryption key (K-1) from the electronic key 2, but generates the encryption key (K-1) from the SEED code (SC-1) that is obtained from the electronic key 2. The SEED code (SC-1) is temporarily stored in the memory 67.

Next, the immobilizer ECU 6 stores the generated encryption key (K-1) in the memory 67 (step S9). The use of the registered encryption key (K-1) allows the immobilizer ECU 6 to perform ID verification with the electronic key 2.

Next, the immobilizer ECU 6 provides the registration tool 8 with the database update signal to update the information of the database 9 (step S10). The database update signal includes the SEED code (SC-1), which is used for generating the encryption key (K-1) corresponding to the vehicle ID (VID-A) stored in the immobilizer ECU 6. The registration tool 8, after receiving the database update signal, transmits the SEED code (SC-1) in association with the vehicle ID (VID-A) to the database 9 through the network, which is not shown in the drawings, and stores the SEED code in the database 9 (updates database 9) (step S11). As a result, as shown in FIG. 3, the SEED code (SC-1), which serves as information related to the encryption code (K-1) corresponding to the vehicle ID (VID-A), is saved in the database 9. The vehicle ID (VID-A) and the encryption code (K-1) stored in the memory 67 of the immobilizer ECU 6 conform to the vehicle ID (VID-A) and the encryption code (K-1) stored in the memory 42 of the electronic key 2. This allows the immobilizer ECU 6 and the electronic key 2 to perform ID verification. The immobilizer ECU 6 deletes the SEED code from the memory 67 after updating the database 9.

Next, the manufacturing operation of the electronic key 2 that is additionally registered to the immobilizer ECU 6 after vehicle shipment will be described. As shown in FIG. 5, in the component factory, the vehicle ID (VID-A) of the vehicle 1, in which the immobilizer ECU 6 is installed, and the encryption key (K-2) corresponding to the vehicle ID (V-ID) for additional registration are extracted from the database 9 in accordance with a placed order and stored in the memory 42 of the additionally registered electronic key 2. The additionally registered electronic key 2 is manufactured to correspond to the immobilizer ECU 6. This allows the additionally registered electronic key 2 to perform ID verification with the immobilizer ECU 6 without a special registration operation. The additionally registered electronic key 2 is manufactured and shipped without the SEED code stored in the memory 42.

Next, the manufacturing operation of a replacement immobilizer ECU 6 will be described. As shown in FIG. 6, in the component factory, the vehicle ID (VID-A)) of the vehicle 1, in which the immobilizer ECU 6 for replacement is installed, and the encryption key (K-2) corresponding to the vehicle ID (V-ID) are extracted from the database 9 in accordance with a placed order and stored in the memory 67 of the replacement immobilizer ECU 6. The replacement immobilizer ECU 6 is manufactured in conformance with the immobilizer ECU 6 used prior to replacement. This allows the replacement immobilizer ECU 6 to perform ID verification with the electronic key 2 without a special registration operation.

Deletion of the SEED code, which is performed after the registration operation, will now be described.

An inspection is conducted on the vehicle 1 prior to shipment of the vehicle 1, in which a variety of components have been installed in an assembly line. In the inspection, challenge response verification is performed between the registered immobilizer ECU 6 and the electronic key 2. The challenge response verification is also periodically performed when the engine 11 of the vehicle 1 is driven. The periodic challenge response verification allows the user of the vehicle 1 to recognize whether or not the electronic key 2 is located in the passenger compartment of the vehicle 1 when the engine 11 is driven.

Figure 7:
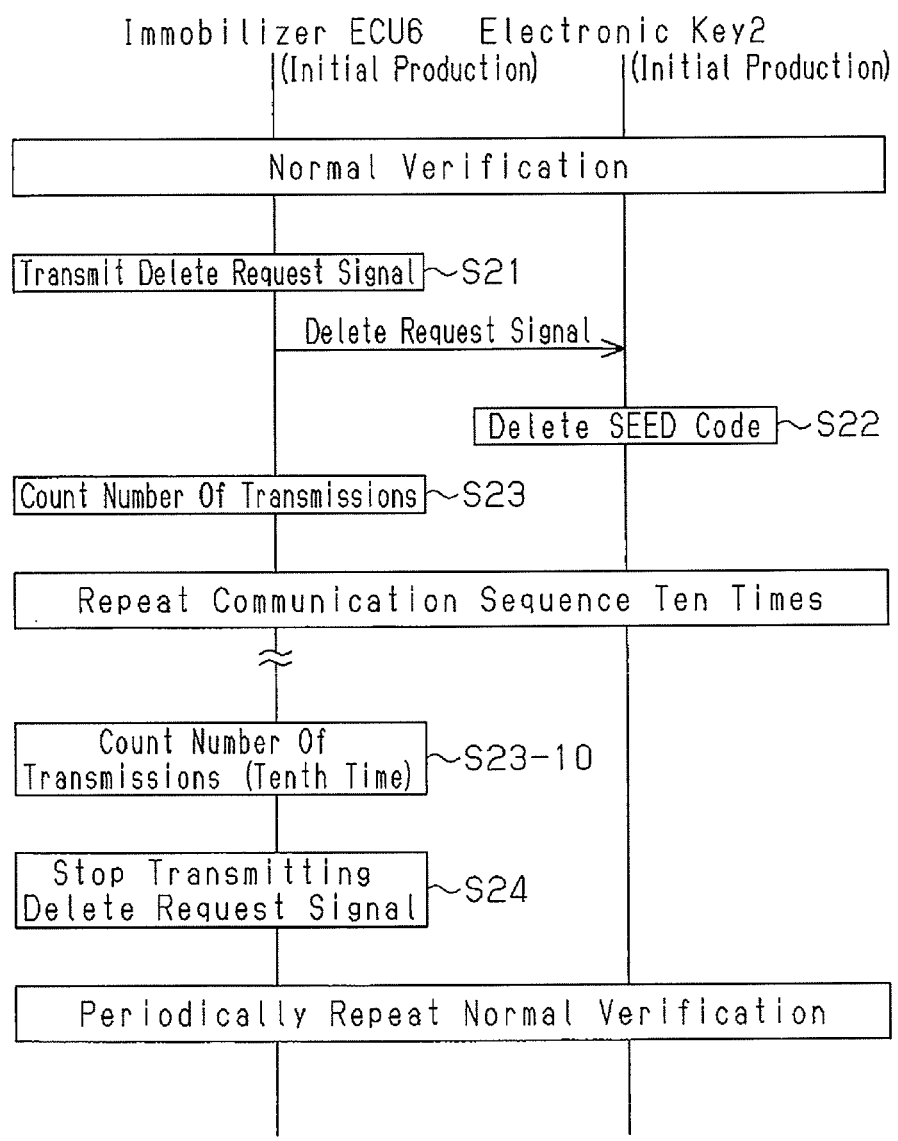
FIG. 7 is a sequence chart showing a verification operation of the electronic key system.

In general, the electronic key 2 is located inside the passenger compartment of the vehicle 1 when the engine 11 is driven. As shown in FIG. 7, the immobilizer ECU 6 transmits a deletion request signal, which requests for deletion of the SEED code, to the electronic key 2 between normal verifications performed with the electronic key 2 (step S21). When receiving the deletion request signal, the electronic key 2 deletes the SEED code from the memory 42 (step S22). After the immobilizer ECU 6 transmits the deletion request signal, the counter 68 of the electronic key 2 increments the count value (step S23).

When the engine 11 is driven, the immobilizer ECU 6 periodically performs a sequence of communication such as the communication for normal verification and the transmission of the deletion request signal. When the counter 68 counts ten (step S23-10), the immobilizer ECU 6 stops further transmission of the deletion request signal (step 24). Thereafter, the immobilizer ECU 6 performs only normal verification.

The present embodiment has the advantages described below.

(1) The immobilizer ECU 6 transmits a deletion request signal, which requests for deletion of the SEED code, to the electronic key 2 between normal verifications, which are periodically performed with the electronic key 2. When receiving the deletion request signal, the electronic key 2 deletes the SEED code from the memory 42. Under this situation, communication for normal verification does not overlap transmission of the deletion request signal. Thus, normal verification may be properly performed between the immobilizer ECU 6 and the electronic key 2.

(2) Each time the immobilizer ECU 6 performs normal verification, the immobilizer ECU 6 transmits the deletion request signal. The immobilizer ECU 6 repeatedly transmits the deletion request signal until the number of times the deletion request signal is transmitted reaches the threshold. This increases the probability of the electronic key 2 receiving the deletion request signal. The SEED code is easily deleted from the electronic key 2. This restricts unauthorized leakage and acquisition of the SEED code from the electronic key 2 and limits generation of an encryption key from the SEED code using the key generation logic f. Thus, it is difficult to manufacture an unauthentic duplicate of the electronic key 2 that corresponds to the shipped immobilizer ECU 6.

(3) The encryption key that is registered to the immobilizer ECU 6 is saved in the database 9 in association with the vehicle ID. When manufactured, the additionally registered electronic key 2 and the replacement immobilizer ECU 6 store the vehicle ID and the associated encryption key, which are saved in the database 9. This allows for ID verification between the immobilizer ECU 6 and the electronic key 2 without a special registration operation.

(4) The additionally registered electronic key 2 is manufactured without the SEED code stored in the memory. That is, the additionally registered electronic key 2 does not include the SEED code when shipped out from the factory. Thus, it is difficult to manufacture an unauthentic duplicate of the electronic key 2 that corresponds to the shipped immobilizer ECU 6.

The above embodiment may be modified as follows.

In the above embodiment, the immobilizer ECU 6 stops transmission of the deletion request signal when the transmission frequency of the deletion request signal counted by the counter 68 reached ten. However, any value may be set for the frequency, that is, the number times the deletion request signal is transmitted before stopping the transmission of the deletion signal. Specifically, the value may be set to one. In this manner, the same advantages as the above embodiment may be obtained.

In the above embodiment, the counter 68 may be omitted. Such a situation also obtains advantage (1) of the above embodiment.

In the above embodiment, the key generation logic f may be deleted from the immobilizer ECU 6 after a registration operation. This obviates registration of a different electronic key to the immobilizer ECU 6. Also, this obviates the leakage of the key generation logic f. Deletion of the key generation logic f may be performed, for example, during a period from when the encryption key K is generated (step S8) and when the vehicle 1 is shipped. In another example, instead of deleting the key generation logic f, the use of the key generation logic f by the immobilizer ECU 6 is prohibited after the registration operation. This also obviates registration of a different electronic key to the immobilizer ECU 6.

In the above embodiment, the immobilizer ECU 6 transmits the deletion request signal between normal verifications. The immobilizer ECU 6 may transmit a signal that differs from the deletion request signal between normal verifications. For example, the different signal may be an information signal, which includes the vehicle status (such as remaining fuel amount). This allows for the user to check the vehicle status with the electronic key 2 at a location separated from the vehicle 1. The vehicle status may change due to chronological changes resulting from the use of the vehicle 1 or the like. Thus, with regard to information signals including the vehicle status, it is desirable that there be no restrictions set for the transmission frequency threshold.

In the above embodiment, after the registration operation of the electronic key 2, the SEED code (SC-1) is saved in the database 9 as information related to the encryption code (K-1) registered to the immobilizer ECU 6. Instead of the SEED code (SC-1), the encryption code (K-1) may be saved as the information in the database 9. In this case, the encryption key K, which is extracted from the database 9, may be stored in the immobilizer ECU 6. This allows for omission of the calculation using the key generation logic f when the encryption key K is stored in the replacement immobilizer ECU 6.

In the above embodiment, the immobilizer system 3, in which the electronic key 2 is inserted into the key cylinder, is illustrated as an example of a radio communication system of the present invention. However, the radio communication system of the present invention may be an electronic key system that allows for communication when the electronic key 2 enters a communication area generated by the vehicle 1.

In the above embodiment, the immobilizer system 3, in which the electronic key 2 is activated by a driving radio wave received from the vehicle 1 and transmits a radio signal, is illustrated as an example of a radio communication system of the present invention. However, the radio communication system of present invention may be a so-called wireless system, in which the electronic key 2 transmits a radio signal toward the vehicle 1 in response to a manual operation of a switch on the electronic key 2.

In the above embodiment, the electronic key system of the vehicle 1 is illustrated as an example of a radio communication system of the present invention. However, the radio communication system of the present invention may be an electronic key system of a building such as a house.

The modified examples may be combined, preferred examples may be combined, and modified examples and preferred examples may be combined.

The invention claimed is:

1. A radio communication system, comprising:
a portable device; and
a communication subject that includes a controller, wherein
the portable device and the controller of the communication subject are configured to periodically perform verification to verify the portable device, and to perform exchange of an information signal, which includes information differing from that of the verification, between the portable device and the communication subject;
the exchange of the information signal is performed during a period between periodic performances of the verification;
the portable device and the communication subject hold the same encryption key, and the verification performed between the portable device and the controller of the communication subject uses the encryption key;
the controller stores identification information, which is unique to the communication subject, and key generation logic, which is used to generate the encryption key;
the portable device stores the encryption key and an encryption key generation code, which is unique to the portable device;
the key generation logic and encryption key generation code are used to generate the encryption key;
the controller is configured to perform a registration process comprising:
writing the identification information to the portable device through radio communication with the portable device;
retrieving the encryption key generation code from the portable device through radio communication with the portable device;
generating an encryption key that is the same as the encryption key of the portable device from the retrieved key generation code using the key generation logic stored in the controller, and
storing the generated encryption key in the controller;
wherein the controller is configured to transmit, to the portable device, a deletion request signal, which requests deletion of the encryption key generation code and serves as the information signal during a period between performances of the verification; and wherein the portable device is configured to delete the encryption key generation code from the portable device when the deletion request signal is retrieved.

2. The radio communication system according to claim 1, further comprising:
a database that saves the identification information, which is stored in the controller of the communication subject prior to shipment, in association with an additional registration encryption key or an additional registration encryption key generation code; and
a supplemental portable device and a supplemental controller that store the identification information, which is saved in the database, and an encryption key, which is generated from the additional registration encryption key or the additional registration encryption key generation code saved in the database.

3. The radio communication system according to claim 1, wherein the controller of the communication subject deletes the key generation logic from the controller after the encryption key is generated.

4. The radio communication system according to claim 1, wherein the communication subject repeatedly transmits a signal for performing the verification in intervals of a controlled period, and the communication subject transmits the information signal whenever the communication subject transmits the signal for performing the verification during the controlled period.

5. The radio communication system according to claim 1, wherein the communication subject transmits the information signal during the controlled period and the verification signal during a period other than the controlled period.

6. The radio communication system according to claim 1, wherein the controller is configured to perform operations comprising:
transmitting the deletion request signal each time the controller performs the verification;
counting a number of times the deletion request signal is transmitted, and
stopping further transmission of the deletion request signal when the counted number of times the deletion request signal is transmitted reaches a transmission frequency threshold.

\* \* \* \* \*